United States Patent
Procter et al.

(10) Patent No.: US 10,249,890 B2
(45) Date of Patent: Apr. 2, 2019

(54) METHOD FOR COLD-START OF FUEL CELL STACK

(71) Applicant: AUTOMOTIVE FUEL CELL COOPERATION, CORP., Burnaby (CA)

(72) Inventors: Michael Procter, North Vancouver (CA); Richard G. Fellows, Vancouver (CA); Yosuke Fukuyama, Vancouver (CA); Shiomi Takeshi, Burnaby (CA)

(73) Assignees: Daimler AG, Stuttgart (DE); Ford Motor Company, Dearborn, MI (US); Nissan Motor Co., Ltd., Yokohama-shi, Kanagawa (JP)

(*) Notice: Subject to any disclaimer, the term of this patent is extended or adjusted under 35 U.S.C. 154(b) by 339 days.

(21) Appl. No.: 14/744,034

(22) Filed: Jun. 19, 2015

(65) Prior Publication Data

US 2016/0372768 A1 Dec. 22, 2016

(51) Int. Cl.
 *H01M 8/04* (2016.01)
 *H01M 8/04223* (2016.01)
 (Continued)

(52) U.S. Cl.
 CPC ... *H01M 8/04253* (2013.01); *H01M 8/04029* (2013.01); *H01M 8/0432* (2013.01);
 (Continued)

(58) Field of Classification Search
 CPC ......... H01M 8/04253; H01M 8/04029; H01M 8/04223; H01M 8/04232; H01M 8/04428;
 (Continued)

(56) References Cited

U.S. PATENT DOCUMENTS

2006/0141309 A1 6/2006 Miyata et al.
2009/0305099 A1 12/2009 Chowdhury et al.
(Continued)

FOREIGN PATENT DOCUMENTS

CA 2925876 A1 4/2015
JP 2008210646 A 9/2008
(Continued)

OTHER PUBLICATIONS

International Search Report and Written Opinion in International Application No. PCT/IB2016/000841, dated Jan. 18, 2017.

*Primary Examiner* — Jane J Rhee
(74) *Attorney, Agent, or Firm* — Patent Central LLC; Stephan A. Pendorf

(57) ABSTRACT

Methods and systems are provided for cold-start of fuel cell stack in fuel cell vehicles. In one example, a method may include in response to cold-start of fuel cell vehicle, limiting the load drawn from the fuel cell stack. In addition, a coolant pump may be operated at a higher rate through a bypass loop to get heat quickly to the fuel cell stack to increase the solubility of water in the fuel cell stack to prevent ice formation. The net effect is that the fuel cell stack is then operated within the ice capacity of the membrane, and start-up at lower temperatures is possible without experiencing an intermittent performance drop due to active area freezing. Once the fuel cell stack is sufficiently warmed up, the coolant pump rate and fuel cell stack may be adjusted according to the demand.

3 Claims, 7 Drawing Sheets

(51) Int. Cl.
*H01M 8/04828* (2016.01)
*H01M 8/04029* (2016.01)
*H01M 8/0432* (2016.01)
*H01M 8/04492* (2016.01)
*H01M 8/04955* (2016.01)

(52) U.S. Cl.
CPC ..... *H01M 8/0494* (2013.01); *H01M 8/04223* (2013.01); *H01M 8/04268* (2013.01); *H01M 8/04492* (2013.01); *H01M 8/04529* (2013.01); *H01M 8/04955* (2013.01); *H01M 2250/20* (2013.01); *Y02T 90/32* (2013.01)

(58) Field of Classification Search
CPC ........... H01M 8/04528; H01M 8/0494; H01M 8/04955; H01M 2250/20
See application file for complete search history.

(56) References Cited

U.S. PATENT DOCUMENTS

2010/0119884 A1* 5/2010 Reiser ............... H01M 8/04037 429/429

2010/0167144 A1 7/2010 Kaito et al.
2012/0100449 A1 4/2012 Araki et al.
2014/0335430 A1 11/2014 Kaito et al.

FOREIGN PATENT DOCUMENTS

| JP | 2009026738 A | * | 2/2009 | ............. H01M 8/06 |
| JP | 4322040 B2 | | 8/2009 | |
| JP | 2010257635 A | | 11/2010 | |
| JP | 2011175777 A | | 9/2011 | |
| JP | 2011198653 A | | 10/2011 | |
| JP | 4823485 B2 | | 11/2011 | |
| JP | 4830341 B2 | | 12/2011 | |
| JP | 4852819 B2 | | 1/2012 | |
| JP | 4867094 B2 | | 2/2012 | |
| JP | 2012113848 A | | 6/2012 | |
| JP | 4996814 B2 | | 8/2012 | |
| JP | 5086740 B2 | | 11/2012 | |
| JP | 5262125 B2 | | 8/2013 | |

* cited by examiner

METHOD FOR COLD-START OF FUEL CELL STACK

FIELD

The present description relates generally to methods and systems for cold-start of a fuel cell stack in fuel cell vehicles.

BACKGROUND/SUMMARY

A fuel cell vehicle, such as a fuel cell electric vehicle, may use power generated by fuel cell stacks (FCS) to power an on-board electric motor and drive wheels of the vehicle. Fuel cells that make the FCS may be electrochemical devices in which oxygen and hydrogen react to generate electricity, water and heat. The electricity generated at the FCS then drives the electric motor of the fuel cell vehicle, while the water produced at the FCS serves to hydrate the membrane of the fuel cell. Any excess water flows out of the FCS. The heat generated at the FCS may be transferred out of the FCS and into the vehicle (e.g., the cabin space) via a cooling loop. However, at sub-zero or freezing ambient temperatures or during cold-start of the fuel cell vehicle, residual water remaining in the membrane from the previous operation of the FCS turns into ice, thereby blocking the pores in the cathode catalyst layer of the fuel cell. This ice accumulation in the membrane makes portions of the cathode catalyst layer inactive during cold-start of the fuel cell vehicle by blocking the flow of oxygen to the cathode catalyst. If more oxygen and hydrogen is pumped into the fuel cell stack to meet the vehicle operator torque demand and generate heat, more water is generated which may also freeze and render an even larger portion of the cathode catalyst layer inactive, thereby further stopping electrochemical reactions from occurring in the FCS. Further still, any heat that is generated in the FCS as a by-product of the electrochemical reaction is whisked away from the FCS through the cooling loop. The net effect is that more and more ice begins to form in the membrane of the FCS, eventually resulting in a total loss of power in the entire FCS, and the vehicle not starting up.

One example cold-start method for a fuel cell stack is shown by Yoshihito in JP 4830341. The approach utilizes valves to restrict the flow of coolants through the fuel cell stack during a cold-start. Specifically, by using very low coolant flow rates across the fuel cell stack during the cold-start, heat removal from the fuel cell stack is restricted. By also controlling a coolant pump operation, coolant supply to the FCS is reduced at low temperatures. The valves allow for other components in the cooling loop to maintain a higher coolant flow as may be advantageous to dissipate the power drawn from the fuel cell without overheating.

The inventors herein have recognized the above issues and interactions, as well as additional issues of flow restricting systems. As one example, the approach of Yoshihito creates highly non-uniform temperatures throughout the fuel cell stack and the connected coolant loop. Non-uniform temperatures across the fuel cell membrane may lead to uneven distribution of water and ice in the membrane. In particular, at regions where the fuel cell membrane is not sufficiently heated up, the water produced may quickly turn into ice, resulting in active area loss and may eventually lead to FCS shutdown. In addition, a low coolant flow in the FCS may cause overheating of some regions of the FCS. Furthermore, the solution requires valves, which add cost to the vehicle.

In view of these issues, the inventors have identified an approach to reduce ice build-up during start-up of a fuel cell stack under water freezing conditions. In one example, the issues described above may be addressed by a method for a vehicle comprising: during fuel cell stack start-up, limiting power drawn from a fuel cell stack based on a water solubility of the MEA of the fuel cell stack, and a temperature. Limiting the power drawn includes limiting a current density, and wherein the power limiting includes limiting electrical power drawn from the fuel cell stack based on a time to raise an inlet temperature of the fuel cell stack. In this way, the total amount of water (including water remaining and water generated) in the membrane can be controlled to be within an ice tolerance curve of the fuel cell stack.

In one example, the water content of the fuel cell membrane may be learned during a fuel cell stack shutdown and used to determine the water solubility in the MEA and further limit the power drawn from the fuel cell stack during a subsequent start-up when the ambient temperature is below a threshold (such as a threshold where the water may freeze). By knowing the amount of water that remains in the membrane, and limiting the amount of water that is generated as a by-product of the electrochemical reaction in the fuel cell stack (by limiting the power drawn from the fuel cell stack), the membrane may be operated within an ice tolerance curve. Limiting the power drawn from the FCS includes not drawing the full power but drawing only a fraction of the entire power that the FCS is capable of generating. By drawing limited power from the FCS, where the limit may be determined in real time during the start-up based on sensed temperature and water amount estimates, it may be possible to operate the FCS with reduced intermittent power loss due to ice formation in the membrane. Further, a coolant pump may be operated during the cold-start to return heated coolant at a higher flow rate thereby reintroducing heat back into the fuel cell stack more quickly and reducing the time period over which current is limited.

During freeze start-up of the vehicle, if full power is drawn from the FCS, more water is generated in the FCS. If sufficient heat is not returned quickly to the FCS, water may begin turning into ice and start blocking the pores. It may still be possible to draw power from the FCS, but the performance may begin to degrade and eventually the entire stack may freeze and no power may be generated leading to FCS shutdown. The inventors have recognized that by limiting the power during freeze startup, it may be possible to operate the FSU without any power loss and preempt FCS shutdown. The technical effect of limiting the power drawn from the fuel cell stack when ambient temperature is low is that the fuel cell stack produces less water, and therefore accumulates less ice. In one example, by concurrently directing heat back into the FCS by pumping coolant at a higher flow rate, heat may be quickly returned to the fuel cell stack and any ice in the membrane can be melted. As a result, active freezing of large areas of a fuel cell membrane during a cold-start is reduced. Overall, intermittent or total loss of power in a fuel cell stack during cold-start of a fuel cell vehicle may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
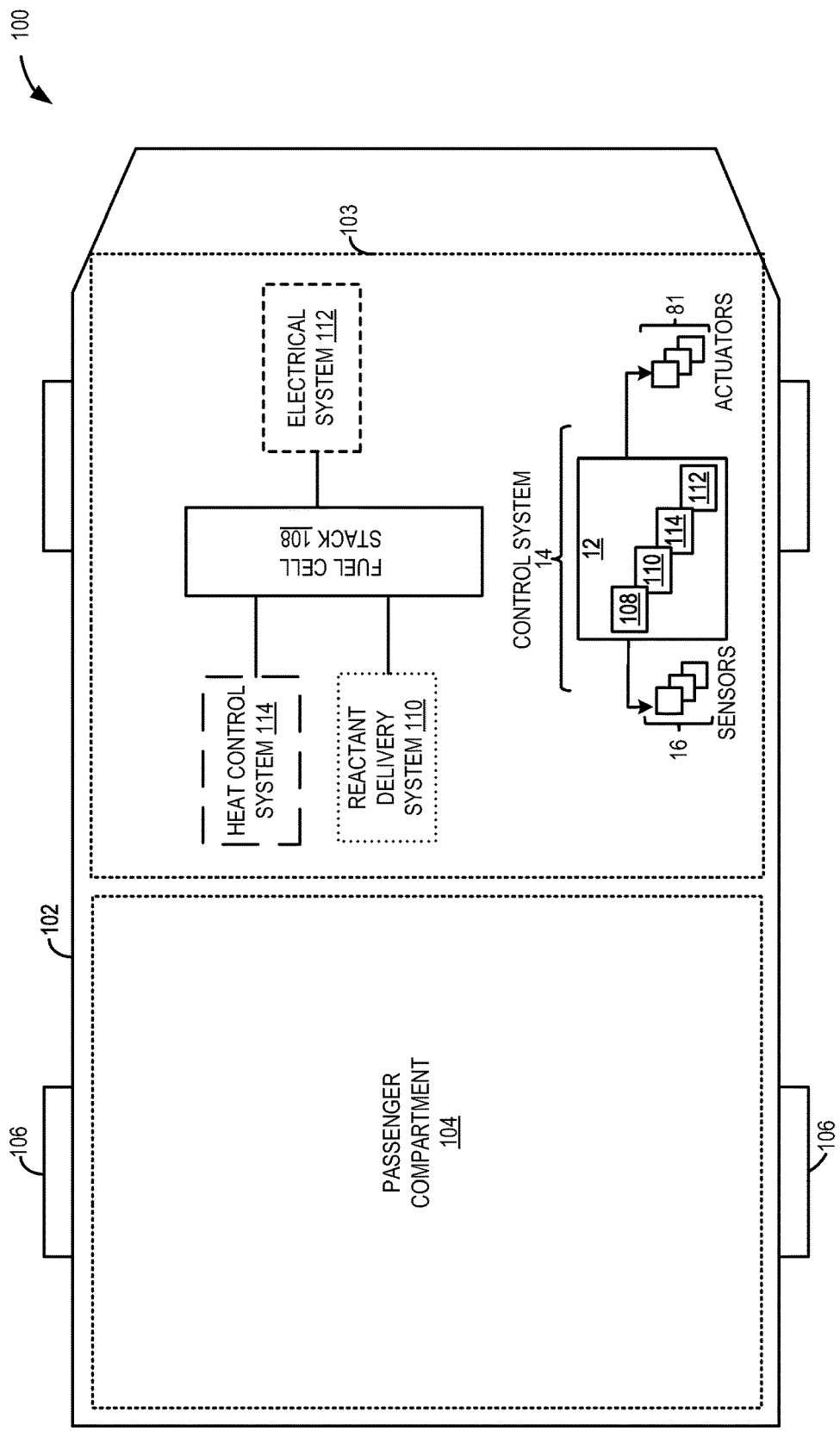
FIG. 1 shows a schematic depiction of a fuel cell vehicle with a fuel cell stack (FCS)
Figure 2:
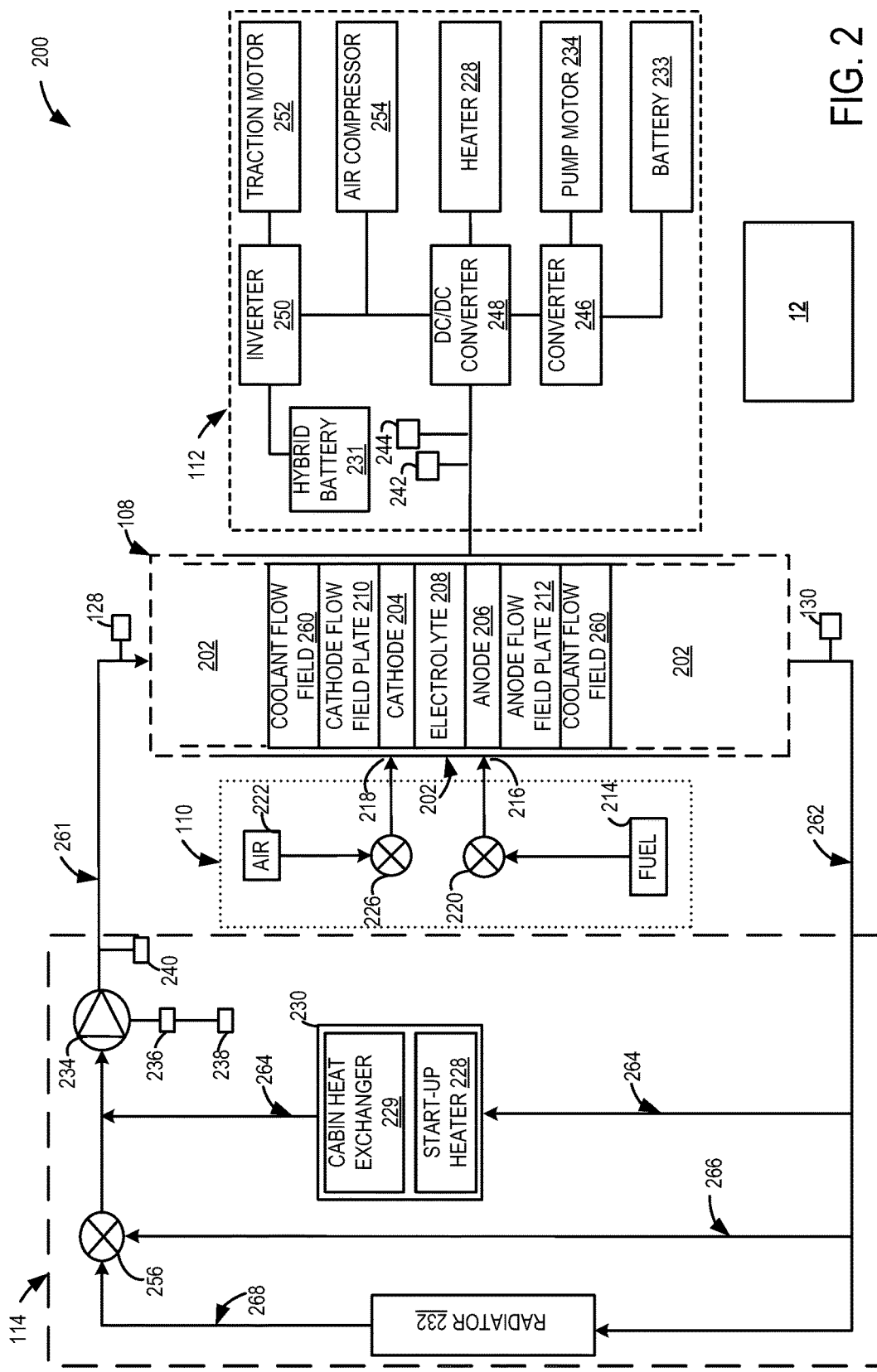
FIG. 2 shows a detailed embodiment of the FCS of FIG. 1 with an associated heat control system, electrical system and reactant delivery system.
Figure 3:
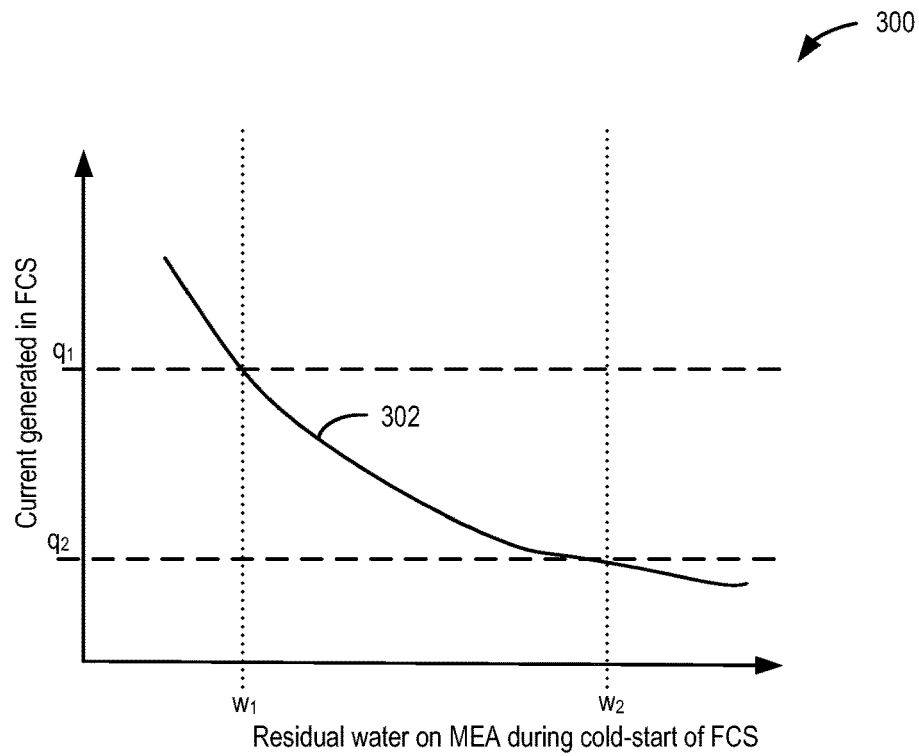
FIG. 3 shows an example relationship between a current generated in the FCS and each of a residual water content and an ambient temperature of the fuel cell vehicle.
Figure 3:
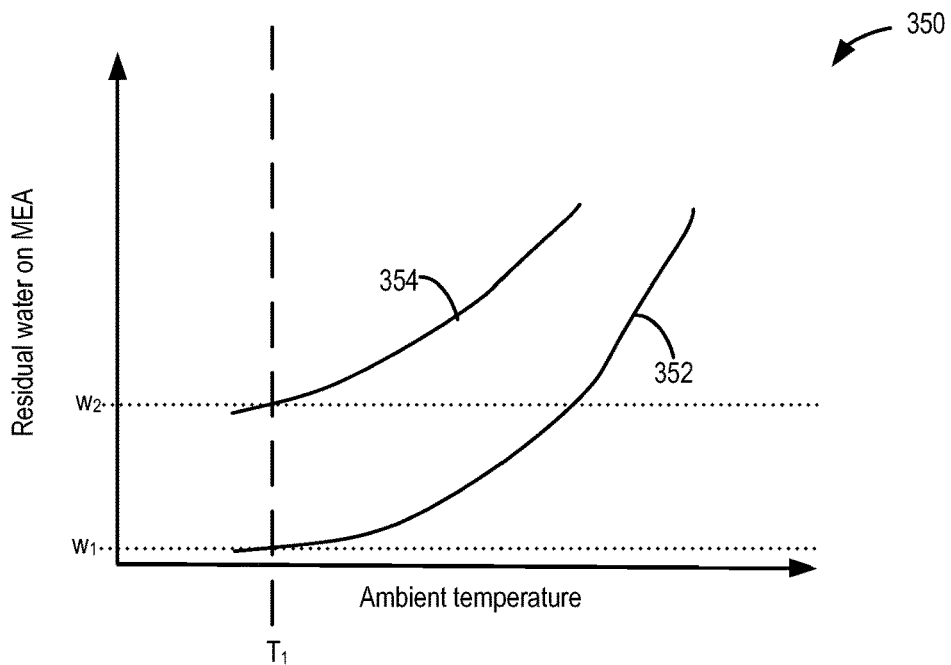

The following description relates to systems and methods for freeze or cold start-up of a fuel cell stack (FCS) in a fuel cell vehicle, such as in the fuel cell vehicle of FIG. 1. Hydrogen fuel and oxygen, fed into the FCS using a reactant delivery system, are electrochemically converted into electricity that is used to drive one or more electric motors of the fuel cell vehicle, as shown in FIG. 2. At freezing ambient temperatures, residual water left in a fuel cell electrolyte membrane may condense as ice in the cathode as shown in FIG. 3, and affect the working of a fuel cell stack. A vehicle controller may learn the amount of residual water left in the fuel cell stack at a FCS shutdown, for example by using the routine described in FIG. 4 (for example by measuring the resistance of the fuel cell stack). Accordingly, during a subsequent cold-start of the vehicle, the controller may limit the current drawn from the FCS while operating a coolant pump, for example, using the method described in FIG. 5. As a result, loss of power during cold-start of the FCS may be reduced. Example relationships between current generated in the FCS and FCS membrane temperatures are shown in FIG. 6. An example fuel cell stack start-up operation is shown in FIG. 7. By limiting the current drawn from a fuel cell stack while adjusting a coolant pump so that the fuel cell stack is heated at a rate that is within the ice tolerance curve of the FCS, loss in power of FCS during cold-start of a fuel cell vehicle may be reduced.

FIG. 1 shows an example embodiment of a fuel cell stack 108 in a fuel cell vehicle 102. The fuel cell vehicle 102 uses electrical current generated by the fuel cell stack 108 to drive various devices. Fuel cell vehicle 102 has drive wheels 106, a passenger compartment 104, and an under-hood compartment 103. The under-hood compartment 103 may house various under-hood components under the hood (not shown) of fuel cell vehicle 102. For example, under-hood compartment 103 may include the fuel cell stack 108, a reactant delivery system 110, a heat control system 114 and an electrical system 112, all of which are described in FIG. 2. The electronic control system 14 of the fuel cell vehicle 102 may include a controller 12 that further includes each of a powertrain controller that records and controls the consumption of electrical current from the fuel cell stack 108 (control module for electrical system 112), a fuel cell stack system controller that detects the stack temperature and control the fuel cell stack logic (control module for fuel cell stack system 108), and a cooling system controller that controls the coolant pump operation (control module for heat control system 114). The cooling system controller may further control the speed of the coolant pump, control the rate of flow of coolant, coolant loops and additionally control a heater. In one example, the powertrain controller, a reactant delivery system controller, fuel cell stack system controller, and the cooling system controller may be configured as various control modules within controller 12. The controller 12 of FIG. 1 is shown receiving information from a plurality of sensors 16 (various examples of which are described herein and may be included in one or more of, or each of systems 110, 112, and 114) and sending control signals to a plurality of actuators 81 (various examples of which are described herein and may be included in one or more of, or each of systems 110, 112, and 114), such as described herein and in FIG. 2.

The fuel cell stack 108 shown in FIG. 2 may be configured to generate power from a reaction between a supplied fuel and oxidant for driving an external load. As such the fuel cell stack 108 may include a plurality of individual fuel cells that may be electrically connected to generate higher powers. A single fuel cell 202 may include a membrane electrolyte assembly 208, herein also referred to as a fuel cell MEA, disposed between a cathode 204 and an anode 206. Typically, the membrane is an assembly comprising ionomer-impregnated film that separates the anode and cathode sides of the fuel cell. The membrane is coated on both sides with a thin catalyst layer that consists of carbon particles, each supporting platinum catalyst particles, all loosely embedded in a matrix of ionomer. The catalyst coated membrane is laminated between hydrophobic gas diffusing and electrically conducting carbon fiber layers. This assembly of catalyst-coated membrane and gas diffusing layers is the membrane electrode assembly (MEA). The ionomer microstructure determines the ion exchange across the membrane that allows the fuel cell reaction to occur, and the Pt particles that catalyze the fuel cell reaction are distributed in the catalyst to augment reaction efficiency. Bipolar plates made from metal or carbon, for example, form a single unit fuel cell 202 which can then be stacked in series to form the fuel cell stack 108. The fuel cell stack 108 may additionally include a cathode flow field plate 210 configured to direct air or oxidant 222 (oxygen, for example) supplied via a cathode inlet 218 to the cathode 204. Similarly, an anode flow field plate 212 may be configured to direct fuel 214 (hydrogen, for example) supplied via an anode inlet 216 to the anode 206. The fuel cell 202 may include a coolant flow field 260, which is typically a third fluid cavity through which the vehicle coolant is circulated to transport heat between the fuel cell 202 and other components in the coolant loop described below. A plurality of the individual fuel cells 202 may be stacked together to form the fuel cell stack 108.

The controller 12 may include a reactant delivery controller (or control module) that regulates the reactant delivery system 110 to regulate the supply of fuel and oxidant to the fuel cell stack 108. The reactant delivery system 110 may include, an oxidant valve 226 for regulating a supply of air or oxidant to the fuel cell stack 108, and a fuel valve 220 for regulating a supply of a fuel 214 to the fuel cell stack 108. In some embodiments, ambient air may be drawn from the environment and directed to the fuel cell cathode by an air compressor 254. In other embodiments, the oxidant may include oxygen from a cylinder and/or compressed air. A fuel tank (or supply) 214 supplies a fuel stream (or an anode stream) to the anode 206. In one example, the supply anode stream may comprise of compressed hydrogen. Other examples such as liquid hydrogen, hydrogen stored in various chemicals such as sodium borohydride or alanates, or hydrogen stored in metal hydrides may be used instead of compressed gas. The fuel tank valve 220 controls the flow of the supply hydrogen. Additional pressure regulator devices (not shown) to control the pressure of the fuel may be included to regulate the flow of the supply hydrogen. Humidifiers (not shown) may be included to add water vapor to the input anode and cathode stream. Humidified water vapor in the input anode and cathode stream may be included to ensure that the membranes in the fuel cell stack remain humidified for optimal operation of the fuel cell stack 108. The controller 12 may receive signals from various sensors such as flow sensors, pressure sensors and temperature sensors and may actuate valves such as the inlet valves 220 and 226, and open or close the valves depending on the reactant requirement.

In one example, hydrogen fuel may be channeled through the anode flow field plate 212 to the anode 206 of the fuel cell 202 while oxygen is channeled to cathode 204 of the fuel cell 202 through the cathode flow field plate 210. At anode 206, the platinum catalyst may split the hydrogen into positive hydrogen ions (H+, protons) and negatively charged electrons (e) according to the following reaction.

$$2H_2 \rightarrow 4H^+ + 4e^- \quad (1)$$

The electrolyte 208 allows the positively charged ions (H+) to travel to the cathode 204 while blocking the flow of electrons. However, the electrons generated at the anode 206 travel through an external circuit and pass through the cathode flow field plate 210 to the cathode 204, thus generating an electric current that is further detected by current sensors in the electrical system 112. At the cathode, supplied oxygen may react with the electrons (e−) arriving through the external circuit and the hydrogen ions (H+) permeating through the electrolyte according to the following reaction:

$$O_2 + 4e^- + 4H^+ \rightarrow 2H_2O + \Delta \quad (2)$$

Thus, oxygen and hydrogen react to generate electricity, water ($H_2O$) and heat ($\Delta$) in the fuel cell 202. A typical fuel cell may generate a voltage from 0.6-0.7 V, for example. Thus, the fuel cell stack 108, with a plurality of fuel cells stacked together and electrically connected, may yield higher voltages. In response to electrochemically converting hydrogen and oxygen, electricity is generated which is detected by a current sensor 242/voltage sensor 244 of the electrical system 112 and further used to operate various electrical devices. The various electrical devices may be associated with and not limited to a vehicle powertrain, occupant heating and cooling, interior/exterior lighting, entertainment devices, and power locking windows.

The particular types of devices implemented in the vehicle may vary based on vehicle content, the type of motor used, and the particular type of fuel cell stack implemented. For example, the electrical devices may include a main drive inverter 250 that further powers the traction motor 252 and a plurality of vehicle electrical components that each consume power to function for a particular purpose such as air compressor 254, cooling pump 234, heater 228, battery 233, etc. For example, current from the fuel cell stack 108 may be converted using a DC/DC converter 248 and used to power each of the air compressor 254 and the heater 228.

The output of the DC/DC converter 248 may further be converted using converter 246 to a voltage, say 12V for example, and then connected to the pump motor 234.

The electrical system 112 further includes energy storage devices 231 and 233. For example, in the following description, energy storage device 233 may be a battery that stores energy during vehicle operation. However, in some instances, energy storage device 231 may also supplement a portion of fuel cell stack power during vehicle operation. Depending on the engine operating conditions, the energy requirement from the fuel cell stack 108 may be adjusted and selected electrical devices in the fuel cell vehicle may be operated. For example, during a cold-start of the fuel cell vehicle, when some of the power generated in the fuel cell stack may be required for heating up the fuel cell stack, electric power generated from the fuel cell stack may be routed to the compressor, heater and the cooling pump, and not to the main traction motor. In such cases, the battery 231 may be able to supply power needed by the traction motor 252 to propel the vehicle until the fuel cell stack 108 has sufficiently warmed up.

As described in equation (2), heat ($\Delta$) is generated in the fuel cell stack (FCS) 108 as a result of the electrochemical reaction in the FCS and this heat may require additional thermal management to reduce overheating of the fuel cell stack 108. The controller 12 may control the heat control system 114 to regulate the temperature of the FCS. The heat control system 114 may include a cabin heating system 230, a radiator 232, and a cooling pump 234 for controlling the temperature of a heat transfer fluid (coolant) through several cooling loops. Examples of coolant include dynalene, ethylene glycol, water and propylene glycol.

The controller 12 may receive signals from sensors such as FCS inlet temperature sensor 128, FCS outlet temperature sensor 130, pressure sensor 240, pump motor sensor 236 and pump speed sensor 238 and may adjust the operation of a thermostatic valve 256 and the coolant pump 234 based on the received signals and instructions stored on a memory of the controller 12. Typically, the heat control system 114 may circulate a coolant through a radiator 232 and a cabin heating system 230. The cabin heating system 230 may include an electric heater 228 and a heat exchanger 229 that rejects heat to the passenger compartment 104 of FIG. 1. Similarly, heat is rejected at the radiator 232, thereby cooling the coolant. The coolant pump 234 may include the pump motor sensor 236, the speed sensor 238 and/or pressure sensor 240 to detect the flow of coolant through a plurality of coolant loops. Based on the output of these sensors, the controller 12 may adjust the operation of the cooling pump and select a coolant loop, for example. A coolant loop may direct the cooling fluid through the FCS 108 to facilitate temperature control and remove heat generated in the FCS as detailed in equation (2). The heat controller 114 may operate the pump 234 to vary a level of heat exchange between the heat exchanger 229 and radiator 232 and the cooling fluid to transport the heat generated in the FCS away from the stack for thermal management and reduce overheating of the stack. A typical coolant flow around the FCS includes cold coolant flowing into the FCS through loop 261, and the heated coolant (heat produced in the reaction heats up the coolant) directed out of the FCS through coolant loops 262 into loop 264 and 268 and back into the FCS through the coolant pump 234 and/or the thermostatic valve 256.

Water is typically soluble in the membrane and ionomer and this water is not frozen, however the solubility of the water in the membrane and ionomer may be affected by low temperatures, as the solubility of water itself is a function of temperature. Ice tolerance or capacity is the amount of non-frozen water that can exist in the MEA before ice formation occurs in the MEA. At low ambient temperatures, when temperature is lower than a threshold (such as threshold where water freezes in the fuel cell components) any water generated in the MEA in the membrane may turn into ice if the ice capacity of the MEA is exceeded, thereby blocking the pores of the cathode catalyst layer. Thus, during freeze or cold-start of the FCS, when additional heat may be required in the FCS to increase the temperature in order to increase the amount of non-freezing water that may be generated, the heated coolant may flow through a loop 266 into the thermostatic valve 256 at a higher flow rate. The loop 266 may be a bypass loop that may be shorter than the loops 268 and 264, for example. In other embodiments, the loop 266 may be longer than loops 268 and 264. The advantage of circulating the coolant at a higher rate through the loop 266 is that the coolant returns back quickly to FCS 108 without dissipating the heat in the radiator 232. Typically, during cold-start of the FCS, the radiator loop 268 may be isolated to reduce release of heat to the environment when it is desired to increase the FCS temperature. In addition, during cold-start of the FCS, the current that is generated in the FCS may be directed to the startup heater 228 which in turn may convert the electrical current into heat thus returning the heat to the coolant. In this way, the electrical power generated in the FCS may be returned back in order to heat the FCS as quickly as possible to prepare the FCS for full operation.

During cold-start, the heated coolant flows out through loops 262 and 266 into the thermostatic valve 256, thus bypassing the radiator 232. The thermostatic valve 256 may be operated in such a way that it may block any cold coolant from flowing through the radiator 232 and into the pump 234 during cold-start of the FCS, and allow only the heated coolant via loop 266 to flow into the coolant pump 234 and hence into the FCS 108. Additionally or alternatively, the cabin heat exchanger 229 may not release heat to the cabin (to preserve it for the FCS) by including a bypass circuit around the heat exchanger 229 (not shown) or a fan (not shown) used to direct cabin air over the cabin heat exchanger 229 may not be operated. However, once the FCS has been sufficiently warmed up, the cold coolant coming from the radiator may begin to flow through the thermostatic valve 256 into the pump 234 and the cabin heat exchanger may release heat to the cabin and the fan may be operated.

As discussed above, any residual water in the membrane (that is, water left in the MEA when the fuel cell stack is shutdown) may affect the solubility of water and in turn affect the ice tolerance (or the ice capacity) of the MEA. If this capacity is exceeded, any water that is generated in the FCS may turn into ice and block the pores of the cathode catalyst layer, thus hampering the flow of oxygen through the fuel cell stack during a cold start-up of the FCS, and holding up the electrochemical reaction. The amount of ice that is accumulated in the MEA during cold-startup may depend on the residual water of the membrane, and on the ambient temperature. Hence the total current or the integrated charge generated in the FCS, which is the sum total of the current generated in each of the fuel cells of the FCS, may depend on each of total amount of water that is present in the membrane of each constituent fuel cell and the ambient temperature, as shown in FIG. 3.

Plot 300 of FIG. 3 shows the relationship between the current generated in the FCS and the residual water on the MEA of the FCS during cold-start of the fuel cell vehicle. Cold-start may include conditions when one of ambient temperature, coolant temperature or membrane temperature is below a threshold. In one example, the threshold may include temperature at which water turns into ice. In some examples, the threshold may include temperatures at which water in the MEA may remain as super cooled water. Cold-start may include a freeze-start, for example. The MEA temperature may be functionally dependent on ambient temperature and/or coolant temperature. Plot 350 shows the relationship between the residual water in the MEA and the ambient temperature. Consider an example graph wherein the residual water in the MEA is low (curve 352) and another example graph wherein the residual water in the MEA is high (curve 354). At low ambient temperature T1, when the residual water in the MEA at a previous shutdown is low ($w_1$) as indicated by 352, then during a cold-start, MEA may be able to hold more water until the ice capacity of the MEA is reached. However, if the residual water in the MEA at previous shutdown is high ($w_2$) as indicated by curve 354 in plot 350, then the amount of water that the MEA can hold before the ice capacity of the MEA is reached is low. Thus, in the examples shown in curves 352 and 352, the FCS may be able to generate a higher current $q_1$ when residual water in the MEA is lower ($w_1$) compared to a lower current $q_2$ when residual water content is higher ($w_2$) as indicated by curve 354. However, in both the examples, once the ice capacity of the membrane is reached, any water that is generated in the fuel cell quickly turns into solid ice. Thus, as more water is generated, the solubility of the MEA to non-freezing water may be exceeded and ice begins to accumulate, hampering the further flow of oxygen into the membrane and hindering the electrochemical reaction on the membrane. Once sufficient ice has accumulated, the reaction on the membrane may stop, and the current produced in the FCS may start dropping, eventually shutting down the entire FCS.

The inventors have recognized that by learning the water solubility of the MEA (which further depends on the residual water content of the membrane during an FCS shutdown (for example, by performing a routine such as described in FIG. 4), temperature, coolant flow rate, coolant volume and coolant pump) and by using the learned residual water content to adjust the power (e.g., current or current density) drawn from the FCS during a subsequent cold-start of the fuel cell vehicle (as described in FIG. 5), it may be possible to reduce the issue of ice formation in the membrane that eventually leads to intermittent or total loss of power of the FCS.

Instructions for carrying out method 400 and the rest of the methods included herein may be executed by a controller based on instructions stored on a memory of the controller and in conjunction with signals received from sensors of the vehicle system, such as the sensors described above with reference to FIGS. 1 and 2. The controller may employ engine actuators of the engine system to adjust engine operation, according to the methods described below.

Figure 4:
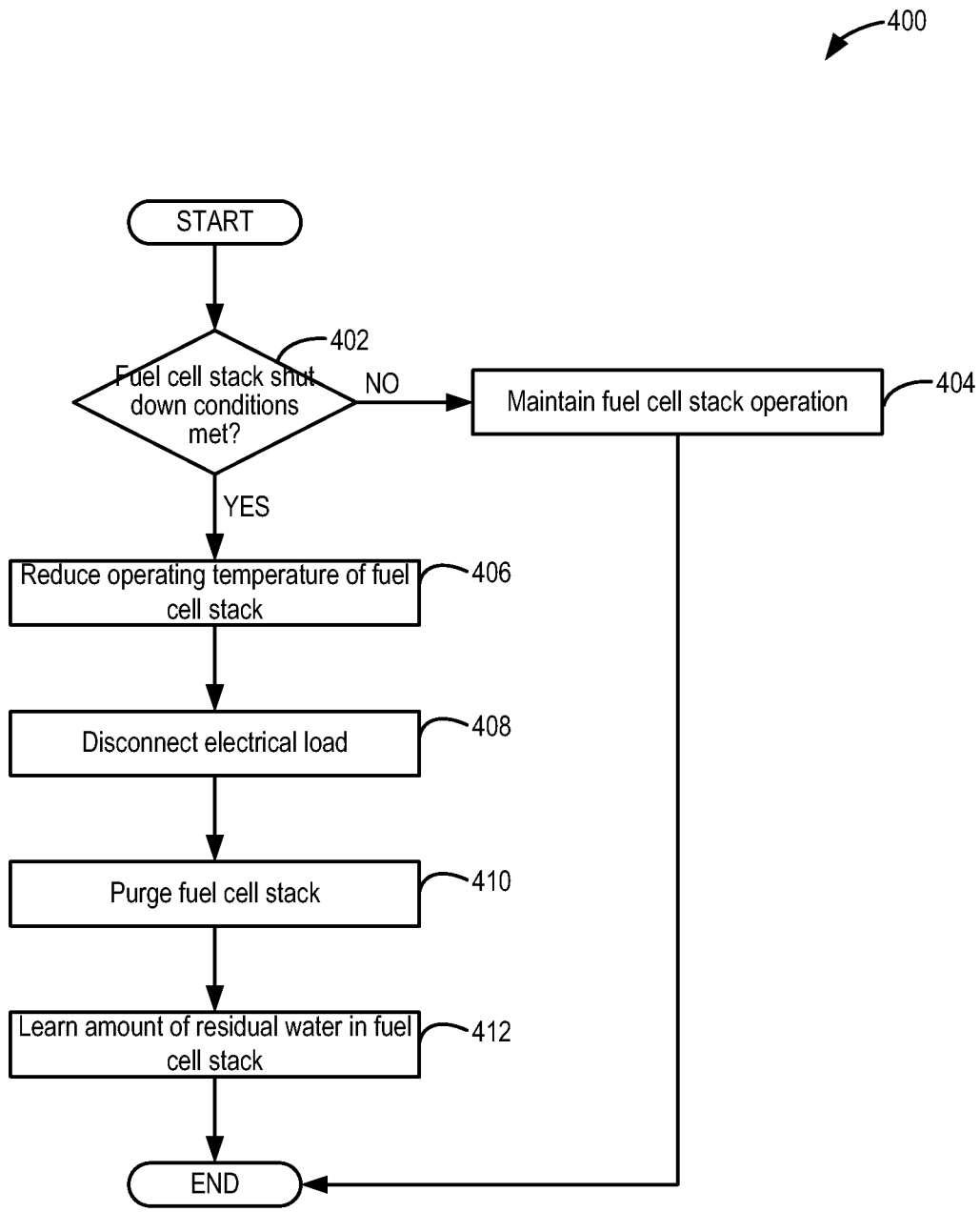
FIG. 4 shows a high level flowchart depicting a method for FCS shutdown.

Referring now to FIG. 4, an example method 400 is provided for FCS shutdown. Method 400 includes determining if fuel cell stack shutdown conditions are met at 402. In one example, fuel cell stack shutdown conditions may considered met in response to a vehicle shutdown request. As an example, the fuel cell vehicle may be turned off and shutdown in response to a vehicle operator turning a key to an off position of an ignition switch and/or removing the key from the ignition switch. In another example, the fuel cell vehicle may be turned off in response to a vehicle operator pressing a start/stop button of the vehicle to a stop position. Other fuel cell stack shutdown conditions may include the fuel cell stack power output being temporarily interrupted. For example, if the power demand from the load application ceases (or reduces) or if another power source commences delivery of power to the load application (e.g., power being provided from on-board energy storage device such as a battery), the fuel cell stack may be shutdown. In yet another example, the fuel cell stack may be disconnected from the load application due to an emergency shutdown of the fuel cell stack based, for example, on a maintenance recommendation triggered by a detected condition of the fuel cell system. Such conditions include, as non-limiting examples, an abnormal fuel flow through the FCS, an irregular temperature condition (e.g., fuel cell stack overheating), irregular voltage from the FCS, etc.

If the fuel cell stack shutdown conditions are not met, then method 400 proceeds to 404 where the fuel cell stack operation may be maintained based on the engine operating conditions. For example, the fuel cell stack may continue to be operated to generate power as demanded by the vehicle operator. If the vehicle is climbing a steep hill or if the operator tips-in, for example, then more power may be generated by the fuel cell stack to meet the higher power demand. The controller may regulate the valves of the fuel cell stack such that more air and fuel may be supplied to the fuel cell stack to generate more power, while adjusting the coolant pump and coolant flow rates to reduce overheating in the fuel cell stack. In one example, the coolant pump rate may be operated at a faster rate and the coolant may be circulated through a longer loop such that the heat is dissipated in the radiator and/or the cabin heat exchanger and cold coolant is returned to the stack.

If fuel cell stack shutdown conditions are met at 402, method 400 proceeds to 406 where the operating temperature of the fuel cell, and hence that of the fuel cell stack, may be reduced. Specifically, the heat control system may operate a cooling pump to cool the fuel cell stack to a predetermined temperature, as detected by the fuel cell stack inlet and outlet temperature sensors. As an example, the temperature of the fuel cell stack may be reduced by increasing the coolant rate and/or circulating coolant through a coolant loop including the FCS and dissipating the heat through radiator and cabin heating system, for example. In this way, the cold coolant may return to the FCS quickly and reduce the temperature of the FCS. Method 400 may then proceed to 408 where the external load is removed from the fuel cell stack by disconnecting the electrical system from the fuel cell stack. This may further include, disconnecting the electrical devices drawing power from the fuel cell stack. For example, the electrical system may no longer power devices such as heater, battery, fraction motor, etc.

Continuing with FIG. 4, upon removing the electrical load, method 400 may proceed to 410 where the fuel cells in the fuel cell stack may be purged. In one example, liquid water in the fuel cell stack may be removed by purging the reactant channels system with diluted fuel or air.

Upon purging the fuel cell stack at 410, method 400 may proceed to 412 where the total amount of residual water in the membrane of the fuel cell stack may be learned and the method ends. The residual water content in the membrane may be measured by a humidity sensor in the FCS, or by measurement of the fuel cell stack resistance, or by operation at a set of fixed reactant flows a prescribed time or by a combination of measurement of stack/coolant temperature and stack resistance. After learning the residual water content, the method ends.

Figure 5:
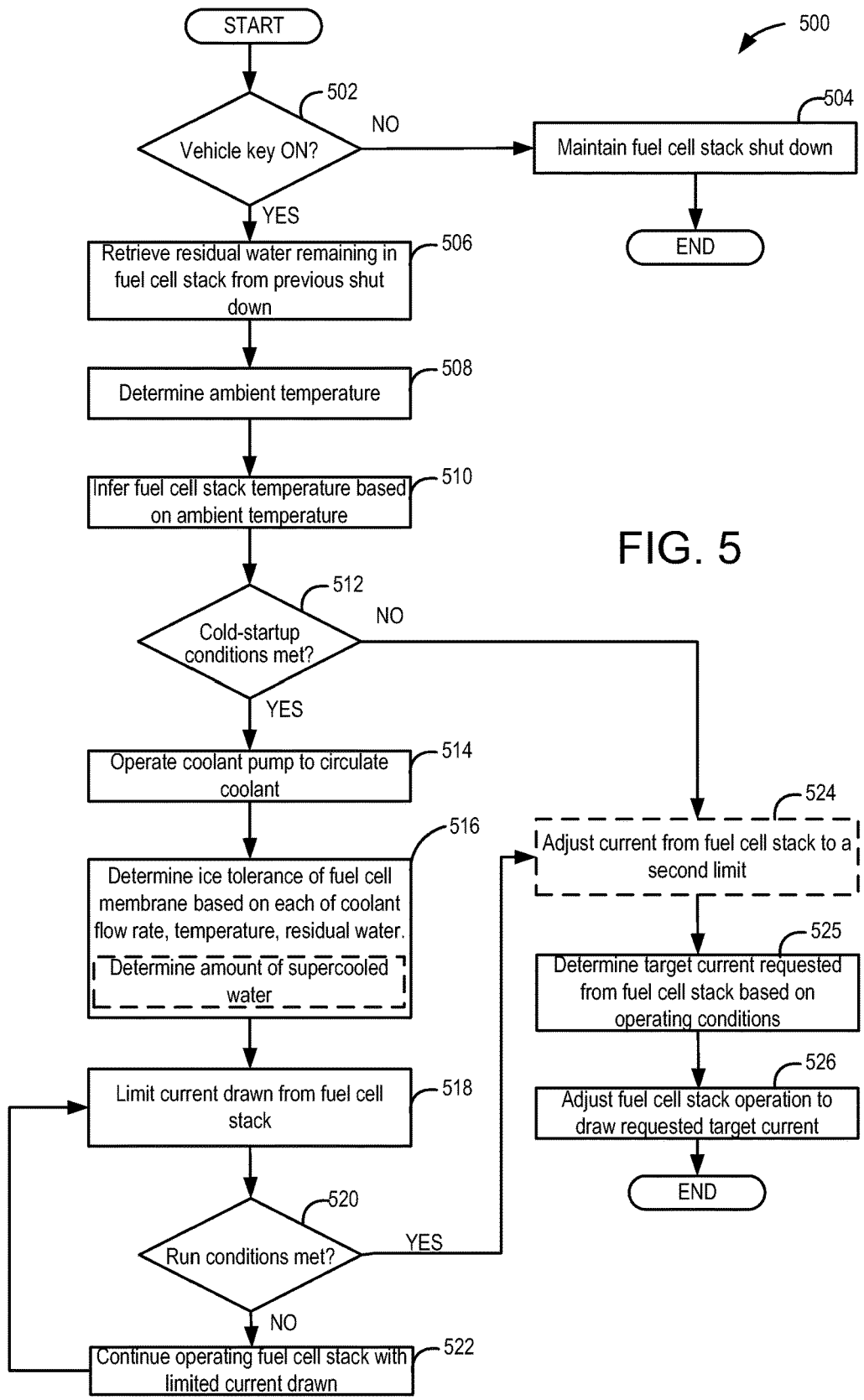
FIG. 5 shows a high level flowchart depicting a method for operating the FCS during a cold-start of the fuel cell vehicle.

Turning now to FIG. 5, an example method 500 for operating the fuel cell stack during a cold-start of the fuel cell vehicle is shown. At 502, it may be determined if vehicle start-up conditions are present. In one example, a vehicle start-up may be determined in response to a vehicle operator pressing a vehicle start/stop button to a start position. As another example, vehicle start-up conditions may be confirmed in response to the operator inserting a key in the ignition and turning the key to an ON position of the ignition switch. As still another example, a vehicle start-up condition may be confirmed in response to the vehicle operator pressing an accelerator pedal. If vehicle start-up conditions are not confirmed, then method 500 proceeds to 504, where the fuel cell and hence the fuel cell stack of the fuel cell vehicle may be maintained shutdown, and the method ends. However, if vehicle start-up conditions are confirmed, method 500 proceeds to 506, where the total residual water remaining in the fuel cell stack at a fuel cell stack shutdown immediately preceding the current fuel cell stack start-up, with only non-operating there between, may be retrieved (as described in FIG. 4). Herein, the fuel cell stack was maintained shutdown preceding the current fuel cell stack start-up and was not operated in the interim. Next, method 500 proceeds to 508 where a current ambient temperature may be determined. In one example, the current ambient temperature may be determined from the output of a temperature sensor installed in the vehicle. Method 500 then proceeds to 510 where the fuel cell stack temperature may be determined. In one example, the fuel cell stack temperature is inferred based on the ambient temperature determined at 508. It may be appreciated that the fuel cell stack temperature may be functionally dependent on the ambient temperature and/or coolant temperature. In another example, the fuel cell stack temperature may be determined based on the output of one or more of the fuel cell stack inlet and outlet temperature sensors (such as temperature sensors 128 and 130 in FIG. 2, for example).

Method 500 then proceeds to 512 where it may be determined if cold start-up conditions of the fuel cell stack are met. Cold start-up conditions may be considered met if one of ambient temperature, fuel cell stack temperature or coolant temperature is below a threshold. For example, the threshold may be the temperature below which water freezes and turns into ice. If cold or freeze start-up conditions are met, then method 500 proceeds to 514 where the coolant pump may be operated to circulate coolant through the fuel cell stack. Operating the coolant pump may include adjusting the coolant to flow through a coolant loop during the fuel cell stack start-up and operating the coolant pump at a first, higher flow rate. In one example, the coolant loop may bypass the radiator through the thermostatic valve back to the fuel cell stack. In one example, during the fuel cell stack start-up the coolant pump is operated to provide an output of between 7 LPM-50 LPM. As such, prior to the start-up of the fuel cell stack, the coolant pump is disabled, and the coolant stagnates in the coolant loop. However, when the fuel cell stack is started, the coolant pump is enabled, and the coolant flows through a coolant loop at a higher rate. Furthermore, the coolant may flow through a loop bypassing the radiator, for example. The technical effect of directing flow through a loop that bypasses the radiator at a higher rate is that heat generated in the fuel cell stack can be quickly returned to the fuel cell stack and less heat is dissipated at components in a longer coolant loop such as at the radiator. By recirculating heat to the FCS during the cold-start, the heat may be advantageously used increase the solubility of non-freezing water that may be accumulated in the fuel cell membrane during a cold-start of the vehicle, improving fuel cell stack performance during cold-starts.

Method 500 then proceeds to 516 where the ice tolerance curve of the fuel cell stack is determined based on, temperature and residual water content of the membrane. At low temperatures the solubility of water in the MEA is reduced depending on the temperature. Residual water will remain non-frozen in the MEA provided that the solubility limit is not reached. In addition, water that is generated as a by-product of the electrochemical reaction at the membrane will turn into ice if the solubility is exceeded. As such, current, heat and water may be generated as the fuel cell stack is started up. The heat produced by the fuel cell stack may exceed the solubility limit and turned into ice in situ. Once ice starts getting accumulated in the cathode catalyst layer, oxygen flow may be disrupted, and the electrochemical reaction may no longer be able to occur and no current may be generated in the fuel cell stack. The amount of water that the membrane can hold before it turns into ice and fuel cell stack stops working is determined by the ice tolerance curve of the membrane. The ice tolerance curve or ice capacity of the membrane is a measure of how much water the membrane can hold, and is determined by the pore volume of the membrane, resistivity of the membrane, thickness of the membrane, equivalent weight of the membrane, the membrane water uptake, residual water in the membrane from a previous shutdown, and the ambient temperature. For a chosen design of the fuel cell stack, the pore volume and membrane uptake may be fixed and may be calculated as a function of the temperature. These values may be adaptively updated in a look-up table which the controller may access to determine the ice tolerance curve or limit of the membrane of the fuel cell stack. In another example, the controller may determine the ice tolerance curve or limit based on the output of an algorithm that uses each of pore volume of the membrane, resistivity of the membrane, thickness of the membrane, equivalent weight of the membrane, the membrane water uptake, residual water in the membrane from a previous shutdown, and the ambient temperature as inputs.

Figure 6A:
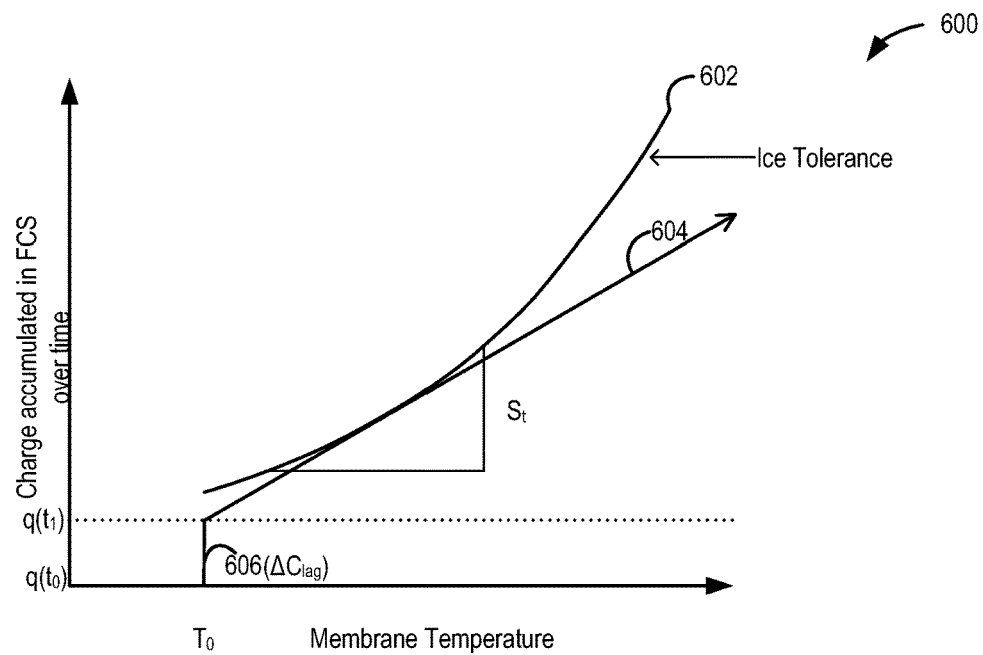
FIG. 6A shows an example relationship between an ice tolerance curve of the FCS and the ambient temperature of the fuel cell vehicle.
Figure 7:
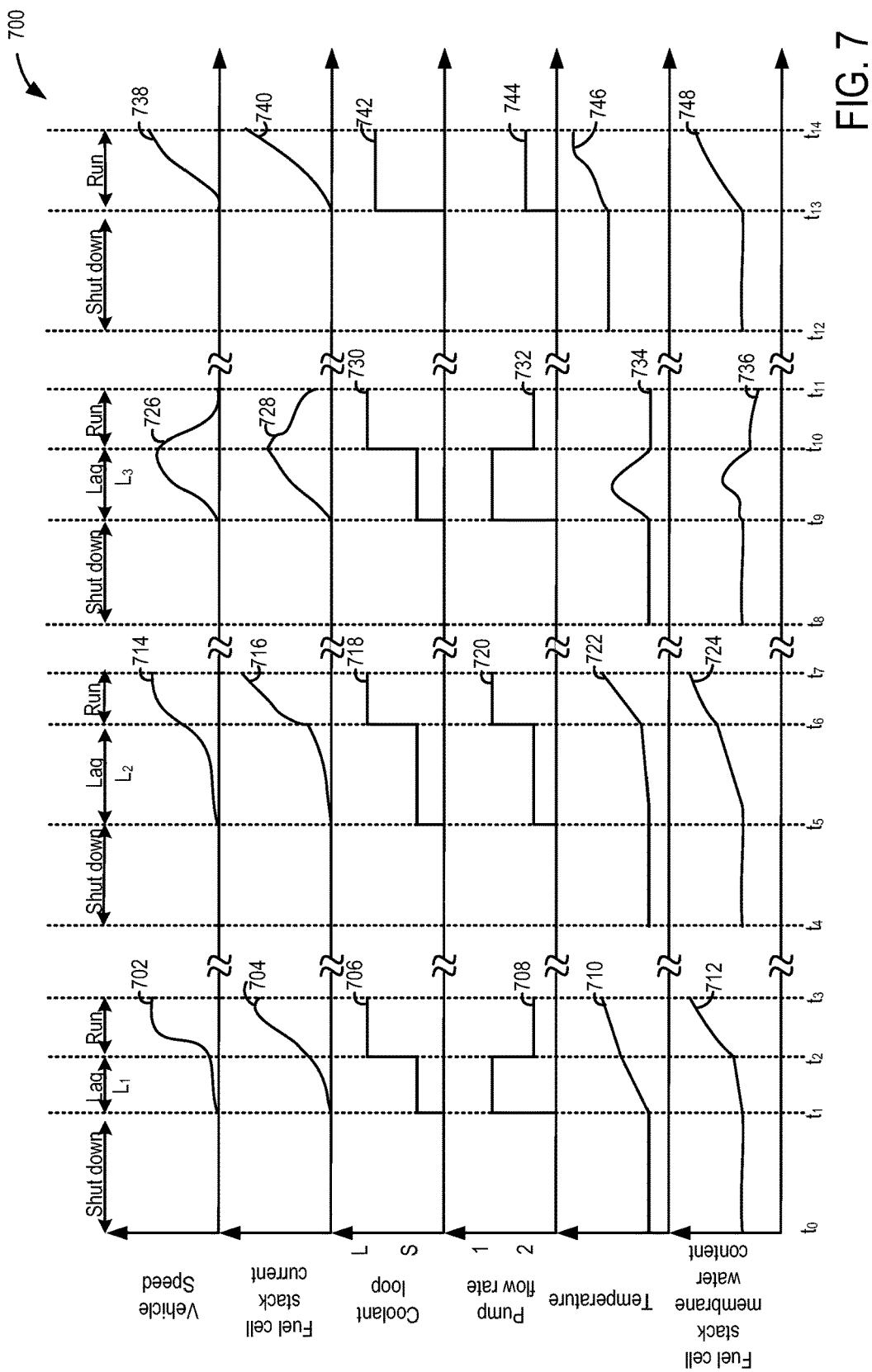
FIG. 7 shows an example relationship between fuel cell stack current, fuel cell stack temperature and fuel cell stack membrane residual water content, during a cold-start as compared to a hot-start of a fuel cell vehicle, while operating a coolant pump.

Functionally, the ice tolerance of the fuel cell membrane is represented as a curve, as shown in plot 600 of FIG. 6A. Fuel cell stack membrane temperature is shown along the X-axis, and the accumulated charge q or the integral of the current j generated in the fuel cell stack over time is shown along the Y-axis. The current generated further depends on the temperature as shown in plots 300 and 350. Mathematically, this can be represented as:

$$q = \int j(T) dt, \quad (3)$$

where q is the integrated charge on the FCS, j is the current generated in a single fuel cell and T is the temperature of the fuel cell. T may further depend on the ambient temperature of the fuel cell. For a chosen material and design of the membrane, the ice tolerance curve may be determined as described earlier. This may further be represented mathematically as $$\int j(T) \partial t = 2F \left( \frac{\varepsilon_{CCL} t_{CCL} \rho_{ice}}{M_{water}} + \frac{t_{mem} \cdot \rho_{mem}(\lambda_{sat}(T) - \lambda)}{EW_{mem}} \right) \quad (4)$$

where F is the Faraday constant $9.64853399(24) \times 10^4$ C mol$^{-1}$, $\varepsilon$ is the pore fraction of the cathode catalyst layer, $t_{CCL}$ and $t_{mem}$ are the thickness of the cathode catalyst layer and the membrane, $\lambda$ is the water uptake of the membrane in total number of water molecules per acid site in the polymer, $\lambda_{sat}(T)$ is the maximum number of water molecules per acid site in the polymer membrane as a function of temperature, $\rho_{ice}$ and $\rho_{mem}$ are the density of ice and membrane, $M_{water}$ is the molar mass of water, $EW_{mem}$ is the equivalent weight represented by the dry mass of the membrane(ionomer) over the number of moles of acid. For a given design of the fuel cell membrane, most of these parameters are constants and the controller may be configured to look up these values from a look-up table and determine the ice tolerance curve. For example an MEA using a 15 μm membrane made with an EW of 870 g/molSO$^{3-}$ with a density of 1.67 g/cm$^3$ and a $\lambda_{sat}$ (−15 C) of 8 molH$_2$O/molSO$^{3-}$, and a cathode catalyst layer which is 8 um thick and a pore fraction of 60% can absorb the water produced from the generation of 9.6 C/cm$^2$ of electrical charge. In the case that the MEA has an initial $\lambda$ of 4 molH$_2$O/molSO$^{3-}$ then the MEA can only absorb a further 7.4 C/cm$^2$ of electrical charge. This is the ice tolerance limit at −15 C in this example. In another example, an algorithm may determine the ice tolerance curve 602 based on each of these parameters. The ice tolerance may be affect the working of the fuel cell stack at low temperatures where water turns into ice without any delay (e.g., at temperatures below −15 C). However, at temperatures that are higher than −15 C, but still below 0 C, for example, water remains in liquid form in the MEA and turns into ice, but with a delay of up to several seconds for example. This is termed super cooled water effect. Combing the super cooled water effect with the ice tolerance of the MEA, the current that can be generated in the fuel cell stack may be represented as $$\int j(T) \partial t = \qquad (5)$$
$$2F \left( \frac{\varepsilon_{CCL} t_{CCL} \rho_{ice}}{M_{water}} + \frac{t_{mem} \cdot \rho_{mem}(\lambda_{sat}(T) - \lambda)}{EW_{mem}} \right) + \frac{j}{A e^{\frac{-B}{T(273K-T)^2}}}$$

where the second term of equation (5) is a mathematical representation of super cooled water and where B is Boltzmann's constant=$1.38 \times 10^{-23}$ J/K and T is the temperature of the MEA in Kelvin (0 C=273K).

In order to reduce too much ice formation in the membrane, if the fuel cell stack is heated up at a rate that maintains the fuel cell stack membrane within its ice tolerance curve at a first ambient temperature (say below −15 C, for example), and further at a second temperature where the super cooled water effect dominates (i.e., between −15 C and 0 C, for example), if the fuel cell stack is heated at a rate that further takes into account the super cooled water effect, then the ice may not get excessively accumulated in the cathode catalyst layer. The heating rate further depends on the derivative of the ice tolerance with respect to temperature which is further dependent on the water uptake of the membrane. Mathematically, the target heating rate $S_t$ may be given as:

$$S_t = 2F * \frac{t_{mem} * \rho_{mem}}{EW_{mem}} * \frac{\partial \lambda_{sat}}{\partial T} \quad (6)$$

Thus, the required, or target heating rate $S_t$ depends on the membrane thickness, density, equivalent weight of the membrane (which may be controlled based on the design of the fuel cell as such) and the water uptake temperature characteristic (which is a property of sulfonic acid) given by $$\frac{\partial \lambda_{sat}}{\partial T}$$

for example.

However, the obtainable heating rate or the so called forecast heating rate $S_f$ may depend on how much heat that can be generated in the fuel cell stack and the thermal mass of the fuel cell stack, for example. Mathematically, this forecast heating rate may be described as:

$$S_f = \frac{C_{P,FCS}}{A_{STM} * \left(\frac{\Delta H}{2F} - (1 - q_{frac}) * \left(\frac{\Delta G}{2F} - \eta_S - j * R_{CELL} * (T_{MEA})\right)\right)} \quad (7)$$

where $C_{P,FCS}$ is the thermal mass of the fuel cell stack, $A_{STM}$ is the total fuel cell active area, $q_{frac}$ is the fraction of electrical power produced which is returned to the cooling loop as heat, $\Delta H$ is the molar heat combustion, $\Delta G$ is Gibbs free energy for oxidation of hydrogen, $\eta_s$ is surface activation overpotential, j is the current density, $R_{cell}$ is the fuel cell resistance which further depends on temperature of the membrane ($T_{MEA}$). For a given fuel cell design, example values may be $C_{P,FCS}$=70 kJ/K, $A_{STM}$ 7 m$^2$, $q_{frac}$=70%, $\Delta H$–142 MJ/kg, $\Delta G/2$ F–1.18V, $\eta_s$=0.38V, and $R_{cell}$ (–15 C)=0.285 Ω·cm$^2$. By operating the fuel cell stack such that a limited current density j is drawn from the fuel cell stack, a heating trajectory dependent on the ambient temperature may be achieved.

In FIG. 6A, curve 604 represents the forecast heating rate. As long as $S_f$ stays within the ice tolerance curve 602, enough heat may be supplied back to the fuel cell stack to reduce ice formation in the MEA and thus current may be continually drawn from the fuel cell stack without any intermittent loss of power. For example, by controlling the current density j of the fuel cell stack, it may be possible to control the forecast heating rate. The controller may look up the values and determine the forecast heating rate $S_f$, for a given fuel cell stack design, for example. Alternatively, an algorithm may determine $S_f$ based on the mathematical equation by inputting the values into the equation.

When the fuel cell stack is operated, current, water and heat are generated as the electrochemical reaction occurs in the fuel cell stack. The heat that is generated in the fuel cell stack may increase the ice tolerance, however it is typically extracted away from the fuel cell stack through a heat control to provide cooling functions to other components in the cooling circuit. During freeze or cold start-up of fuel cell stack, the fuel cell stack temperature (and ambient temperature) is below a threshold. For example, the threshold may be the temperature below which water freezes and turns into ice. At time $t_0$, the fuel cell stack is at temperature $T_0$ that is below the threshold. The fuel cell stack is shutdown and hence there is no charge accumulated in the fuel cell stack as indicated by q($t_0$). The temperature of the membrane is $T_0$ which may be functionally dependent on the ambient temperature and/or coolant temperature, for example. If fuel cell stack start-up is initiated at time $t_0$ when the membrane temperature is $T_0$, the controller may determine the ice tolerance curve 602 (either using a look-up table or from an algorithm) and may begin heating up the fuel cell stack by adjusting a trajectory based on the forecast heating rate. The forecast heating rate trajectory depends on the membrane temperature i.e., where membrane temperature is along the X-axis. The membrane temperature may be inferred from the coolant inlet temperature, for example. The lower the temperature, the shallower the trajectory is in order to stay within the ice tolerance curve. A shallower trajectory may be possible by drawing limited current from the fuel cell stack as described by equation (6). Upon determining the forecast heating rate, such that the trajectory is below the ice tolerance curve, the look-up table may be adaptively updated with the values of current and temperature, for example. At a subsequent fuel cell stack cold start-up, the updated values of current and temperature may be retrieved by the controller.

However, there is a thermal lag, that is, the heat generated in the fuel cell stack may not cause an increase in the fuel cell stack temperature, as the heat is being transported by the coolant pump and the associated cooling loop, as described in FIG. 2. The time taken for coolant to circulate through the coolant loop and return to the fuel cell stack is dependent on each of density, volume and mass flow rate of the coolant. For a given pump and coolant, these values may be constants and included in the look-up table. The controller may retrieve these values from the look-up table and determine a lag time given by (t1–t0). At time $t_1$, the amount of charge accumulated in the fuel cell stack is q($t_1$), which is represented as curve 606 ($\Delta C_{lag}$). Though the fuel cell stack is producing current (or accumulated charge, $\Delta C_{lag}$), as indicated by curve 606, there is no increase in temperature of the fuel cell stack, as the heat is distributed to other components in the cooling loop. Thus, the membrane temperature remains at $T_0$. This lag time (from $t_0$ to $t_1$ on plot 600) puts further demand on the heating slope required to stay within the ice tolerance curve. As mentioned, the lag is however related to the coolant volume and flow rate. A higher coolant flow rate may reduce the lag thereby reducing $\Delta C_{lag}$, however, it may make the average temperature of the membrane lower, thus leading to ice formation in the membrane. Therefore the controller adjusts the power drawn from the fuel cell stack while concurrently adjusting the coolant pump flow rate so as to balance the rate of water and heat generation at the fuel cell membrane with the rate of heat dissipation via coolant flow such that the net heat at the fuel cell membrane is sufficient to reduce in situ generated ice, and maintain fuel cell stack conditions within the ice tolerance curve. For example, the controller may adjust the power drawn from the fuel cell stack and the coolant pump flow rate so that the heat return rate of the fuel cell stack is adjusted such that the lag time is reduced and fuel cell stack conditions stay within ice tolerance curve 602. The longer the lag, the controller may limit the current drawn so that $S_f$ is lower the $S_f$ (or the trajectory is shallower), in order to stay within the ice tolerance curve 602. For example, if the lag is long, heat returning to the fuel cell stack is delayed, therefore more charge is accumulated during this time or $\Delta C_{lag}$ is large. With larger lag, and more accumulated charge, the controller may adjust the forecast heating rate or make the trajectory shallower so that the fuel cell stack may be maintained below the ice tolerance curve. However, if the lag is small, heat arrives back at the fuel cell stack quickly, therefore the charge accumulated in the fuel cell stack is small or $\Delta C_{lag}$ is small. With lower $\Delta C_{lag}$, a faster heating rate may be applied to the fuel cell stack and still remain within the ice tolerance curve. The controller may adaptively learn the lag time and adjust the forecast heating rate such that the fuel cell stack is maintained below the ice tolerance, thus pre-empting ice accumulation in the membrane.

Furthermore, during the lag period, the accumulated charge generated in the fuel cell may be determined by the time taken by the coolant to flow through the coolant loop and return to the fuel cell stack. By decreasing the time, coolant may arrive faster at the fuel cell stack. If this coolant is now operated through a bypass loop, wherein the radiator and/or cabin heat control is bypassed, the arriving coolant will still retain heat and may be able to melt the ice in the fuel cell membrane. Thus, the accumulated charge generated during the lag period may be mathematically represented as $$\int_{t=0}^{\tau \sim \frac{\rho_{coolant} V_{coolant}}{\dot{m}_{coolant}}} j \, dt$$

where $\rho_{coolant}$ is the density of the coolant, $V_{coolant}$ is the volume of the coolant and $\dot{m}_{coolant}$ is the mass flowrate of the coolant. For a given coolant system and a coolant, these values are constants. For example, $\rho_{coolant}$ at −15 C 1.09 kg/L, $V_{coolant}$ is 10 L and for a coolant such as a mixture of water and ethylene glycol at a 50% mix ratio. For a typical application a cooling pump may be capable of a coolant mass flow $\dot{m}_{coolant}$ of 0.25 kg/sec.

Thus if the sum of charge accumulated during the lag period together and the charge accumulated during the heating phase remains below the ice tolerance curve, then the fuel cell may be able to function without any interruption in the power generated in the fuel cell stack due to formation of ice. Mathematically, this condition may be represented as:

$$\int_{t=0}^{\tau \sim \frac{\rho_{coolant} V_{coolant}}{\dot{m}_{coolant}}} j \, dt + \frac{C_{PFCS}}{A_{STM} * \left(\frac{\Delta H}{2F} - (1 - q_{frac}) * \left(\frac{\Delta G}{2F} - \eta_S - j * R_{CELL} * (T_{MEA})\right)\right)} \le$$

$$2F * \frac{t_{mem} * \rho_{mem}}{EW_{mem}} * \frac{\partial \lambda_{sat}}{\partial T} +$$

$$2F \left(\frac{\varepsilon_{CCL} * t_{CCL} * \rho_{ice}}{M_{water}} + \frac{t_{mem} * \rho_{mem}(\lambda_{sat}(T_0) - \lambda)}{EW_{mem}}\right) + \frac{j}{A e^{\frac{-B}{T(273K-T)^2}}}$$

(9)

Thus, by limiting the current generated in the fuel cell stack during the lag period (606), and during the heating phase as shown by curve 604, it may be possible to stay within the ice tolerance curve 602 and thus, the fuel cell stack may be able to generate current without experiencing any intermittent loss in power due to accumulation of ice in the MEA.

While the fuel cell stack is capable of generating more current and hence more power, the inventors have recognized that by limiting the power drawn from the fuel cell stack during freeze start-up, it may be possible to operate the fuel cell stack without any intermittent power loss.

Figure 6B:
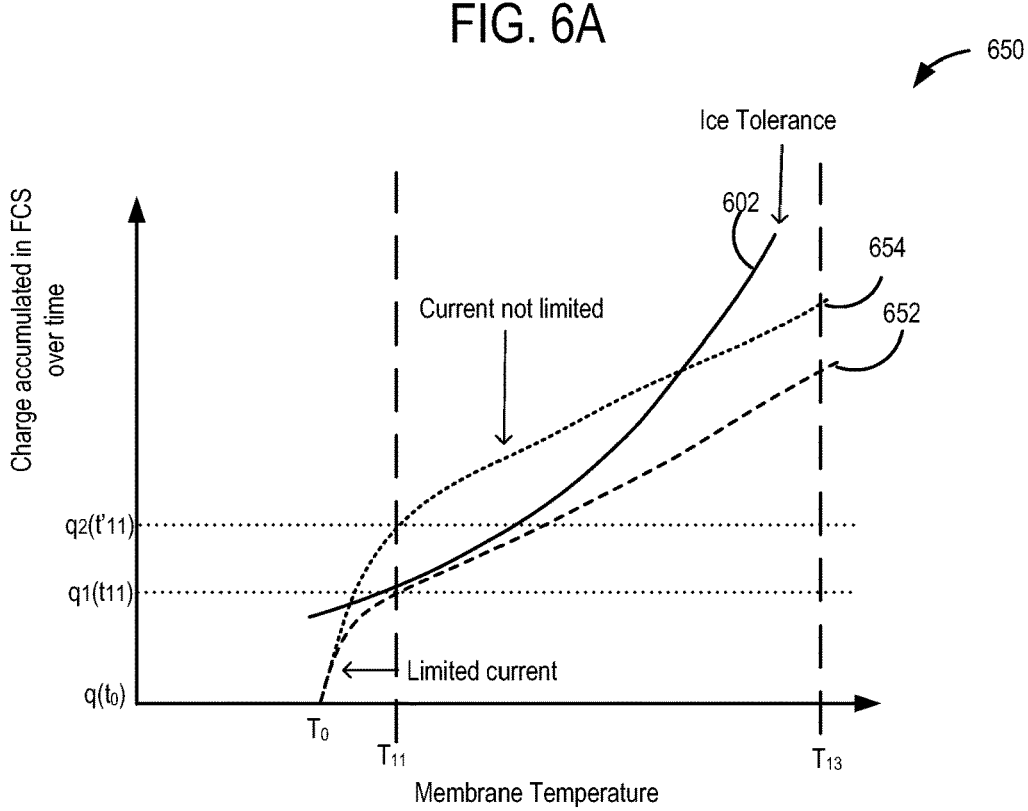
FIG. 6B shows an example relationship between an accumulated charge of the FSU and the ambient temperature of the fuel cell vehicle during conditions when the current generated in the FSU is limited, as compared to when it is not limited.

Plot 650 of FIG. 6B shows an example relationship between an accumulated charge of the fuel cell stack and the fuel cell temperature of the fuel cell vehicle during conditions when the current generated in the fuel cell stack is limited as compared to when it is not-limited. Fuel cell MEA temperature is shown along the X-axis, and the accumulated current or the integral of the current generated in the fuel cell stack over time is shown al the Y-axis. Curve 602 is the ice tolerance curve of the fuel cell membrane, as previously discussed at FIG. 6A. At time $t_0$, the fuel cell stack is at temperature $T_0$ that is below a threshold at which water freezes, for example. The fuel cell stack is shutdown and hence there is no charge accumulated in the fuel cell stack as indicated by $q(t_0)$. The membrane is at $T_0$ which may be functionally depended on the ambient temperature, as described earlier. If fuel cell stack start-up is initiated at time $t_0$ when the membrane temperature is $T_0$, the controller may determine the ice tolerance curve 602 (by using a look-up table, or from an algorithm) and may begin heating up the fuel cell stack by adjusting a trajectory based on the forecast heating rate.

When started up, the fuel cell stack may be able to generate more power or current, and if the entire power or current (or current density) is drawn from the fuel cell stack, then the accumulated charge in the fuel cell is shown by curve 654. At time $t'_{11}$, when the accumulated charge in the fuel cell stack is $q_2(t'_{11})$, the membrane is at temperature $T_{11}$, for example. However, the accumulated charge overshoots the ice tolerance curve 602, as indicated by curve 654. When this occurs, the fuel cell stack may continue to generate current however, the fuel cell stack may experience intermittent power loss due to ice formation. When the ice tolerance or the ice capacity of the membrane is exceeded, any water that is present in the membrane to turns into ice. As the fuel cell stack continues to produce water, it begins to turn into ice and block the pores of the cathode catalyst layer in the MEA. As a result, the fuel cell stack may experience intermittent power loss due to loss in active area of the fuel cell stack. When this happens, there may be drop in fuel cell stack current due to ice accumulating in the MEA, and eventually the entire fuel cell stack may shut down. However, the inventors have recognized that by limiting the current drawn from the fuel cell stack during cold-start of the vehicle, it may be possible to operate the fuel cell stack below the ice tolerance curve 602 as shown by curve 652. Thus by limiting the current drawn from the fuel cell stack to adjust the trajectory of heating rate, and adjusting the pump to reduce the thermal lag, as shown in FIG. 6A, the fuel cell membrane may be maintained below the ice tolerance curve.

When limited current is drawn from the fuel cell stack and coolant rate is increased, the lag is reduced, and thus the accumulated charge is maintained within the ice tolerance as shown by curve 652. At time $t_{11}$, when the accumulated charge in the fuel cell stack is $q_1(t_{11})$, the MEA is at temperature $T_{11}$, for example. It can be seen that $q_1(t_{11})$ is less than $q_2(t'_{11})$. In one example, for a coolant flow rate of 10 liters/min, the average power drawn from the fuel cell stack $q_1(t_{11})$ when current is limited, may be 5.1 kW, while the average power drawn when current is not limited (i.e. $q_2(t'_{11})$) may be 10.4 kW. As shown by curve 652, the accumulated charge falls below the ice tolerance curve indicating that the heat generated in the fuel cell stack may be enough to melt the ice that is formed in the membrane. When the membrane temperature is higher than a threshold, the coolant pump may be operated at a lower rate, while circulating the coolant through a longer loop, for example. In one example, the threshold may be a predetermined temperature above which water continues to remain in liquid phase.

However, when the ambient temperature and/or the fuel cell stack temperature is warm enough or above the freezing point, (for example at temperature $T_{13}$ of FIG. 6B), the heating rate may be asymptotically vertical. At such temperatures, with no ice formation, the method further includes not limiting the accumulated current density drawn from the fuel cell stack. In one example, the accumulated current is limited to a higher current value, and the fuel cell membrane is heated at a higher rate.

In this way, the current drawn from the fuel cell stack and the thermal lag may be adjusted so as to operate the fuel cell stack within the ice tolerance of the membrane. This reduces ice accumulation in the membrane, thereby improving the performance of the fuel cell stack.

Thus, a method for a fuel cell stack coupled in a vehicle comprises during a first fuel cell stack start-up when ambient temperature is below a freezing point and ice formation occurs in a fuel cell membrane, limiting accumulated current drawn from the fuel cell to heat the membrane with a trajectory based on ambient temperature. Additionally, the coolant pump is initially operated at a higher rate until the desired heating trajectory is achieved, and then the coolant pump may be operated at a lower rate. At such temperatures, the accumulated current is limited to a lower current value and the fuel cell membrane is heated at a lower rate until the desired heating trajectory is achieved and then a higher current limit may be applied. The method further includes, during a second fuel cell stack start-up with no ice formation on the membrane, not limiting the accumulated current (or current density) drawn from the fuel cell stack.

Returning to FIG. 5, the ice tolerance curve of the fuel cell stack may be determined at 516 based on each of thickness of the cathode catalyst layer, thickness of the membrane, water uptake by the membrane, density of ice and density of membrane, and equivalent weight of the membrane, as described in FIG. 6. Further, the amount of supercooled water existing in the MEA may be determined. In addition, parameters such as the volume of the coolant, thermal mass, coolant flow rate, temperature of the fuel cell stack, and lag time may be measured in situ and reported to the controller. In another example, these values may be populated and/or adaptively updated in a look-up table stored in the controller's memory and the controller may retrieve these values from the look-up table during the cold start-up. In another example, an algorithm may use the values retrieved from the look-up table and determine the ice tolerance curve of the fuel cell stack. The method then proceeds to 518 where the current drawn from the fuel cell may be limited to maintain the heat generation of the fuel cell stack within the ice tolerance curve. It may be appreciated that though the fuel cell stack is capable of generating more power, the power drawn from it is limited during the cold-startup of the fuel cell stack. The technical effect of limiting the power drawn (or limiting to a first level) includes, reducing the amount of charge and water accumulated in the fuel cell stack, thereby maintaining the fuel cell stack below the ice tolerance curve, thus reducing ice accumulation and preempting fuel cell stack shutdown. The time until which limited current may be drawn from the fuel cell stack may depend on how long it takes for the fuel cell stack inlet temperature (That is, a duration for which limited power is drawn from the fuel cell stack may be based on the temperature) to reach a threshold temperature. For example, the threshold may be temperature at which the lag period ends and the heating trajectory slope is established, for example. As another example, the time threshold may be a pre-determined time value based on any or all of the cooling loop, volume of coolant, residual water remaining in MEA at previous shutdown, the temperature and coolant pump capabilities. By knowing the coolant flow rate as a function of temperature and volume of the loop, the time required for heated coolant to circulate the loop may be determined, for example. A controller may look up the threshold from a look-up table, for example, or alternatively compute the threshold by looking up the cooling loop, volume, temperature and pump capabilities from the look-up table.

Method 500 may then proceed to 520 where it may be determined if run conditions are met. In other words, it may be determined if conditions are present for transitioning the fuel cell stack out of the start-up mode (and into a running mode). Run conditions may be considered met if the fuel cell stack temperature rises above freezing or the heating trajectory is not projected to exceed the ice tolerance (i.e., heating trajectory slope required to stay within the ice tolerance is established). In one example, the fuel cell stack may be transitioned out of the freeze start-up mode in response to the fuel cell stack temperature being higher than a threshold temperature, such as above 0 C. Alternatively, if the heating rate of the fuel cell stack as described at FIG. 6B by curve 652 is projected to stay below the ice tolerance curve 602, then run conditions may be considered met. If run conditions are not considered met, then method 500 proceeds to 522 where the fuel cell stack may be continued to be operated with a limited current drawn from the fuel cell stack, and the coolant pump may continue to be operated at a higher flow rate with coolant flowing through the coolant loop bypassing the radiator, for example. The method may then return to 520. However, if run conditions are met, then method 500 proceeds to 524, where the current drawn from the fuel cell stack may be adjusted to a second limit (and coolant flow rate may be additionally lowered) before proceeding to 525 where a target current of the fuel cell stack may be determined. As such, the target current requested from the fuel cell stack may be based on the operating conditions. For example, if the vehicle is climbing a steep slope, more current may be drawn from the fuel cell stack to drive the traction motors and propel the vehicle wheels. However, if the vehicle is going down a slope, less current may be drawn from the fuel cell stack. Depending on the requested target current, the fuel cell stack operation may be adjusted at 526, by adjusting the flow rate of hydrogen and air into the fuel cell stack, and the method ends.

In this way, during a fuel cell stack cold start-up, ice accumulation in the fuel cell membrane may be reduced by limiting power drawn from the fuel cell stack based on the water solubility of the MEA and a current ambient temperature. The water solubility of the MEA may include the total water solubility of the MEA. Further, the water solubility of the MEA is based on one or more of a total amount of residual water remaining in the MEA at a previous fuel cell stack shutdown, the temperature, a coolant flow rate, a coolant volume and the coolant pump. In some embodiments, the water solubility may be determined from each of the total residual water remaining in the MEA, the temperature, the coolant flow rate, the coolant volume and the coolant pump. The temperature includes one of an ambient temperature, a coolant temperature and a fuel cell stack MEA temperature. In any of the above embodiments, limiting power drawn from the fuel cell stack may include limiting a current density. As used herein, the previous fuel cell stack shutdown refers to a fuel cell stack shutdown immediately preceding the given fuel cell stack start-up with only non-operating there-between. In any of the embodiments herein, limiting the power may include, limiting a current density and further include limiting electrical power drawn from the fuel cell stack based on a time to raise an inlet temperature of the fuel cell stack. The time to raise the inlet temperature may further be based on a time for the inlet temperature to increase by a threshold, wherein the inlet temperature is based on an output of an inlet temperature sensor. In any of the embodiments herein, limiting the power at a given current ambient temperature, includes reducing the current density to a greater degree when the solubility of water in the MEA of the fuel cell stack is lower, and increasing the current density when the solubility of water in the MEA of the fuel cell stack is higher. In any of the embodiments herein, limiting the power may further include, at a given amount of residual water remaining in the membrane of the fuel cell stack, reducing the current density at a higher rate at lower ambient temperature and reducing the current density at a lower rate at a higher ambient temperature In any of the embodiments herein operating the coolant pump includes operating the coolant pump at a first flow rate, and in response to an increase in temperature, operating the coolant pump at a second flow rate, lower than the first flow rate, while flowing coolant through a longer coolant loop. In one example, as shown at FIG. 3 the relationship between the change (reduction) in current density and each of ambient temperature and residual water content is non-linear. However, it will be appreciated that in alternate examples, the relationship between the change (reduction) in current density and each of ambient temperature and residual water content may be linear.

Turning now to FIG. 7, map 700 shows an example relationship between the fuel cell stack current, the fuel cell stack temperature and the fuel cell membrane residual water content, during cold-start and warm-start of the fuel cell vehicle while operating the coolant pump at different rates and circulating the coolant through different coolant loops. Plots 702, 714, 726 and 738 show the vehicle speed of the fuel cell vehicle during different sets of conditions. Plots 704, 716, 728 and 740 show the fuel cell stack current during the corresponding conditions. Plots 706, 718, 730 and 742 show the coolant loop selection during the corresponding conditions. Plots 708, 720, 732 and 744 show the coolant pump flow rate during the corresponding conditions. Plots 710, 722, 734 and 746 show the fuel cell stack temperature during the corresponding conditions. Plots 712, 724, 736 and 748 show the fuel cell stack membrane water content during the corresponding conditions. For each plot, time is depicted along the x (horizontal) axis while values of each respective parameter are depicted along the y (vertical) axis.

During the time between $t_0$ and $t_1$, the fuel cell stack may be shutdown. The residual fuel cell membrane water content learned from a previous shutdown is shown at 712 and may further determine the water solubility of the MEA, and the fuel cell stack (or ambient) temperature is cold as indicated by 710. In the depicted example, when the fuel cell stack is shutdown, the fuel cell stack temperature is reflective of the ambient temperature. The cooling pump is disabled or turned off as shown by 708. Consequently, while the fuel cell stack is shutdown, coolant stagnates in the coolant loop, and the fuel cell stack does not generate any current, as indicated by 704.

At $t_1$, fuel cell stack start-up may be requested in response to the vehicle operator keying on the vehicle and demanding torque. The vehicle operator may key on the vehicle through the use of an active or passive key, or by pressing the start button in the vehicle. Due to the fuel cell stack start-up at $t_1$ being a freeze start-up, between $t_1$ and $t_2$ (first freeze start-up condition), as the fuel cell stack is operated in a lag phase, limited current is drawn from the fuel cell as indicated by 704. Thus, during a first fuel cell stack cold or freeze start-up, the entire power from the fuel cell stack is not drawn, only limited power is drawn. With limited power drawn, the fuel cell stack may be able to power a selected number of electrical devices such as cooling pump, heater and compressor, for example. During this time, power to traction motors and other devices may be supplied though a battery, for example. The coolant pump may be operated at a first, higher flow rate as indicated by 708, and through a first shorter (or bypass) coolant loop as indicated by 706. The technical effect of running the coolant pump at a faster rate and through a shorter bypass loop is that the lag time $L_1$ is reduced. When flowing through the bypass loop, the coolant bypasses the radiator and the cabin heat systems, and reaches the fuel cell stack to increase the temperature of the stack and reduce ice formation. Alternatively, the coolant may flow through a longer coolant loop, but still operated at a higher rate during this lag time between $t_1$ and $t_2$.

The current may be limited based on the water solubility of the MEA which is further based on one or more of the amount of residual water in the MEA, the coolant volume, the coolant rate, and the temperature of the MEA. For example, limiting the current at a given current ambient temperature includes reducing the current density at a higher rate when the residual water remaining in the membrane of the fuel cell stack is higher, and reducing the current density at a lower rate when the residual water remaining in the membrane of the fuel cell is lower. As another example, limiting the current at a given amount of residual water remaining in the membrane of the fuel cell includes reducing the current density at a higher rate at lower ambient temperature and reducing the current density at a lower rate at a higher ambient temperature. In this way, the current drawn is limited based on each of the residual water content and temperature of the fuel cell membrane and the fuel cell stack may be operated below the ice capacity of the membrane. Though the fuel cell stack is capable of generating more power, during a freeze start-up, limited current is drawn from the fuel cell stack in order to maintain the MEA of the fuel cell stack below the ice capacity of the MEA. Moreover, by operating the coolant loop at a higher rate and through a shorter or longer loop without dissipating the heat, heat is recirculated to the fuel cell stack quickly, and more frequently, reducing the lag time. At $t_1$, as heat is recirculated to the fuel cell stack during the fuel cell stack start-up, the residual water remaining in the membrane in the form of ice begins to melt. Concurrently, as the electrochemical reaction occurs in the fuel cell stack, water is continually generated as a by-product, causing the water content of the membrane to rise, as shown at 712. Alternatively, during the first freeze startup condition, power may be limited to a first level for a duration based on temperature, and after that duration, power may be limited to a second level. For example, if ambient temperature is below a first threshold (−15 C, for example), then the power may be limited to a first level for a duration that is based on the temperature, in order for the MEA to stay within the ice tolerance curve. When the temperature is below a second threshold, but is still below freezing (between −15 C and 0 C, for example), then power may be limited to a second level for a second level to take into account the effects of supercooled water. Thus, when the first fuel cell stack start-up is at the ambient temperature that is further below the freezing point, the accumulated current is limited to a lower current value, and when the first fuel cell stack start-up is at an ambient temperature that is less or below the freezing point, the accumulated current is limited to a higher current value.

At $t_2$, the fuel cell temperature may rise above a threshold, such as above freezing, and a run condition may be confirmed. In response to an increase in temperature, the coolant pump may be transitioned to a second flow rate that is lower than the first flow rate, as indicated at 708 while flowing the coolant through a longer loop as indicated by 706. The longer loop includes coolant flowing through radiator and/or cabin heat system. At this time, the current drawn from the fuel cell stack may not be limited. In some examples, the current drawn from the fuel cell stack may be adjusted to a second limit once the slope of the heating trajectory is established. The second limit may be a predetermined limit, or set based on the operating conditions as indicated at 704. For example, if the vehicle speed is high as indicated by 702, more current may be drawn from the fuel cell stack as indicated by 704. However, at $t_3$, if the speed of the vehicle drops, lesser current may be drawn from the fuel cell stack as indicated by 702 and 704 respectively. Thus, by limiting current during cold-start of the vehicle, fuel cell stack may be operated without any ice accumulation in the membrane.

Another fuel cell stack startup is shown at $t_4$-$t_7$. In particular, an example FCS cold-start condition is shown wherein the lag time $L_2$ being longer than lag time $L_1$ of the previous start-up condition. At $t_4$, the residual fuel cell membrane water content from a previous shutdown is shown by 724, the fuel cell stack (or ambient) temperature is cold as indicated by 722, the cooling pump is off as shown by 720, and the fuel cell stack does not generate any current, as indicated by 716. However, at $t_5$, fuel cell stack start-up may be requested. This may be initiated when the operator pressed the start button in the vehicle, for example. Between $t_5$ and $t_6$, the fuel cell stack may be operated in the lag phase, wherein limited current may be drawn from the fuel cell stack as indicated by 716. However, the pump may be operated in a slower rate as indicated by 720 and through the shorter coolant loop as indicated by 718. When the coolant pump is operated at a slower rate, the lag time is longer as seen in map 700. In order to operate the fuel cell stack within the ice tolerance limit, lesser current may be drawn from the fuel cell stack as indicated by 716 in order to reduce the slope of the heating rate (or trajectory) for example. This further ensures that the membrane is operated below the ice tolerance limit. At $t_6$, the fuel cell stack temperature may rise above freezing, for example, indicating a run condition. For example, if the vehicle speed is high as indicated by 714, more current may be drawn from the fuel cell stack as indicated by 716. In response to an increase in fuel cell stack current, the coolant pump may be operated at the first flow rate that is faster than the second flow rate as indicated by 720 while flowing the coolant through a longer loop, through the radiator, for example, as indicated by 718. Thus, by adjusting the current drawn and the coolant flow in the stack, the heating rate and the lag time may be adjusted to stay within the ice tolerance of the membrane. In this way, accumulation of ice in the membrane may be reduced, and the fuel cell stack may be operated without any loss in power.

Another fuel cell stack startup is shown at $t_8$-$t_{11}$. An example FCS cold start-up is shown wherein current drawn is not limited. At $t_8$, the residual fuel cell membrane water content from a previous shutdown is shown by 736, the fuel cell stack (or ambient) temperature is cold as indicated by 734, the cooling pump is off as shown by 732, and the fuel cell stack does not generate any current, as indicated by 728. However, at $t_9$, fuel cell stack start-up may be requested. Between $t_9$ and $t_{10}$, the fuel cell stack may be operated in the lag phase, however, the current drawn from the fuel cell stack is not limited as indicated by 728. The coolant pump may be operated at a faster rate as indicated by 732 and coolant may be circulated through a shorter coolant loop as indicated by 730, where the heat is not dissipated through the radiator and cabin heat control systems, for example. As more current is drawn from the fuel cell stack, more water is generated, however, there is not enough heat returning back to the fuel cell stack to melt the ice. As a result, more and more ice begins to accumulate in the fuel cell stack, and the temperature of the fuel cell stack begins to decrease as shown by 734. Ice accumulation in the fuel cell membrane makes large portions of the membrane inactive, and thus the current generated in the fuel cell stack begins to drop as indicated by 728. This may further lead to shutdown of the fuel cell stack, and eventually cause the vehicle speed to drop, as indicated by 726.

Another fuel cell stack startup is shown at $t_{12}$-$t_{14}$. In particular, an example of a second FCS start-up is shown wherein the temperature is higher than a threshold (temperature where no ice formation occurs, for example). At $t_{12}$, the residual fuel cell membrane water content from a previous shutdown is shown by 748, the fuel cell stack (or ambient) temperature is warm as indicated by 746, the cooling pump is off as shown by 744, and the fuel cell stack does not generate any current, as indicated by 740. However, at $t_{13}$, fuel cell stack start-up may be requested. Since the fuel cell stack temperature is above freezing, the residual water in the membrane may continue to remain in the liquid phase. The fuel cell stack may not be operated in a lag phase. Between $t_{13}$ and $t_{14}$, the fuel cell stack may be operated in a run condition, and the current drawn from the fuel cell stack is not limited as indicated by 740. The controller may adjust the operation of the cooling pump according to the fuel cell stack operation. For example, the coolant pump may be operated at a slower rate as indicated by 744 if the demand on the fuel cell stack current is not high. The coolant may be circulated through a longer loop as indicated by 742.

The systems described herein and with regard to FIGS. 1 and 2 along with the methods described herein and with regard to FIGS. 4 and 5 may enable one or more systems and one or more methods. In one example, a method for a vehicle is provided, the method including during fuel cell stack start-up, limiting power drawn from a fuel cell stack based on a water solubility of a membrane electrode assembly (MEA) of the fuel cell stack and a temperature. In any of the preceding exam wherein limiting power drawn includes limiting a current density, and wherein the power limiting includes limiting electrical power drawn from the fuel cell stack based on a time to raise an inlet temperature of the fuel cell stack. In any of the above embodiments, the time to raise the inlet temperature is based on a time for the inlet temperature to increase by a threshold, wherein the inlet temperature is based on an output of an inlet temperature sensor. In any of the above embodiments, the time to raise the inlet temperature of the fuel cell stack is further based on one or more of a coolant flow rate, the inlet temperature and a volume of a coolant loop. In any of the above embodiments, the water solubility of the MEA is determined based on one or more of a total amount of residual water remaining in the MEA at a previous fuel cell stack shutdown, the temperature, a coolant flow rate, a coolant volume and the coolant pump. In any of the above embodiments, the previous fuel cell stack shutdown includes a fuel cell stack shutdown and vehicle shutdown immediately preceding the fuel cell stack start-up with only fuel cell non-operation and vehicle non-operation there between. In any of the above embodiments, the temperature includes one of an ambient temperature, a coolant temperature and a fuel cell stack MEA temperature. In any of the above embodiments, the limiting includes, at a given current ambient temperature, reducing the current density to a greater degree when the solubility of water in the MEA of the fuel cell stack is lower, and increasing the current density when the solubility of water in the MEA of the fuel cell stack is higher. In any of the above embodiments, the limiting includes reducing the current density at a higher rate at lower ambient temperature and reducing the current density at a lower rate at a higher ambient temperature. In any of the above embodiments, operating the coolant pump includes operating the coolant pump at a first flow rate, the method further comprising, in response to an increase in temperature, operating the coolant pump at a second flow rate, lower than the first flow rate, while flowing coolant through a longer coolant loop.

In another example, a method for a fuel cell stack coupled in a vehicle is provided, comprising during a first fuel cell stack start-up with ice formation on a fuel cell stack membrane electrolyte assembly (MEA), limiting accumulated current drawn from the fuel cell stack to heat the membrane with a trajectory based on ambient temperature and during a second fuel cell stack start-up with no ice formation on the membrane, not limiting the accumulated current drawn from the fuel cell stack. In any of the above embodiments, during the first fuel cell stack start-up, a coolant pump is initially operated at a higher rate until a temperature of the MEA is increased, and then the coolant pump is operated at a lower rate. In any of the above embodiments, the first fuel cell stack start-up is at an ambient temperature below a freezing point, and wherein the second fuel cell stack start-up is at the ambient temperature above the freezing point. In any of the above embodiments, when the first fuel cell stack start-up is at the ambient temperature that is further below the freezing point, the accumulated current is limited to a lower current value, and when the first fuel cell stack start-up is at an ambient temperature that is less or below the freezing point, the accumulated current is limited to a higher current value. In any of the above embodiments, during the first fuel cell stack start-up, the fuel cell stack membrane is heated at a higher rate and during the second fuel cell stack start-up, the fuel cell stack membrane is heated at a lower rate.

In one example, a vehicle system, comprises a fuel cell stack including a membrane electrolyte assembly (MEA), a radiator, a heat exchanger for heating a vehicle cabin space and an electric coolant pump for circulating coolant through the fuel cell stack, the radiator, and the heat exchanger. The controller with computer readable instructions stored on non-transitory memory may be configured to operate the coolant pump during a fuel cell stack start-up to flow coolant through the fuel cell stack, estimate a water solubility in the MEA based on ambient temperature and residual water content in the membrane from a previous fuel cell stack shutdown. In any of the above embodiments, the controller may further limit a current density drawn from the fuel cell stack based on the estimated water solubility and heat the membrane to increase the water solubility of the MEA. In any of the above embodiments, the controller may further limit the current density at a larger rate when the ambient temperature is lower or the residual water content is higher, and limit the current density at a smaller rate when the ambient temperature is higher or the residual water content is lower. In any of the above embodiments, operating the coolant pump to flow coolant through the fuel cell stack further includes flowing coolant through the fuel cell stack while bypassing the radiator. In any of the above embodiments, after melting the ice formed on the membrane, the controller may increase the current density drawn from the fuel cell membrane while flowing coolant through the fuel cell stack and the radiator. In any of the above embodiments, limiting the current density drawn from the fuel cell stack based on the estimated ice formation includes limiting water generation at the fuel cell membrane following the fuel cell stack start-up within an ice tolerance limit of the membrane.

In this way, by limiting power drawn from a fuel cell stack during fuel cell stack start-up based on residual water remaining in a membrane of the fuel cell stack at a previous fuel cell stack shutdown, and a current ambient temperature, the accumulation of ice in the membrane may be reduced. The technical effect of limiting the power drawn from the fuel cell stack when ambient temperature is low is that the heating trajectory is maintained below the ice tolerance, and by directing the heat back into the FCS by pumping the coolant at a faster rate through the cooling loop, heat is quickly returned to the fuel cell stack, thus reducing lag time and ice in the membrane may be melted. Thus, without the addition of components such as valves which would otherwise be expensive to manufacture and install in the vehicle, the fuel cell stack may be able to generate power during cold-start of the fuel cell vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for starting up a fuel cell stack (FCS) from a starting temperature below freezing in a vehicle having a vehicle controller programmed to store (a) the amount of residual water left in the fuel cell stack at FCS shutdown, (b) an ice tolerance curve representing the maximum amount of ice which may be present in a FCS during startup at any temperature up to 0° C., and (c) the amount of water generated as a by-product of the electrochemical reaction in the FCS when generating current, the method comprising:
- retrieving the amount of residual water remaining in the FCS from the previous shut-down;
- determining ambient temperature;
- inferring FCS temperature based on ambient temperature; and
- (a) in the event that inferred FCS temperature is below 0° C., operating the FCS under the control of the vehicle controller with limiting the amount of current used until the temperature in the FCS reaches 0° C. such that ice produced during current generation will not exceed the ice tolerance curve; or
- (b) in the event that the inferred cell stack temperature is above 0° C., starting up the fuel cell stack without limiting the current drawn from the fuel cell stack.

2. The method of claim 1, wherein a coolant pump is initially operated at a higher rate until a temperature of the MEA is increased, and then the coolant pump is operated at a lower rate.

3. The method of claim 1, wherein the fuel cell stack start-up is at an ambient temperature below a freezing point.

* * * * *